Oct. 25, 1966  B. A. COOK  3,281,017
APPARATUS FOR DISPENSING MEASURED QUANTITIES OF LIQUIDS
Filed April 26, 1965  3 Sheets-Sheet 1

INVENTOR
BERNARD ALFRED COOK
BY
Hood, Gust & Irish
ATTORNEYS.

Oct. 25, 1966
B. A. COOK
3,281,017
APPARATUS FOR DISPENSING MEASURED QUANTITIES OF LIQUIDS
Filed April 26, 1965
3 Sheets-Sheet 2
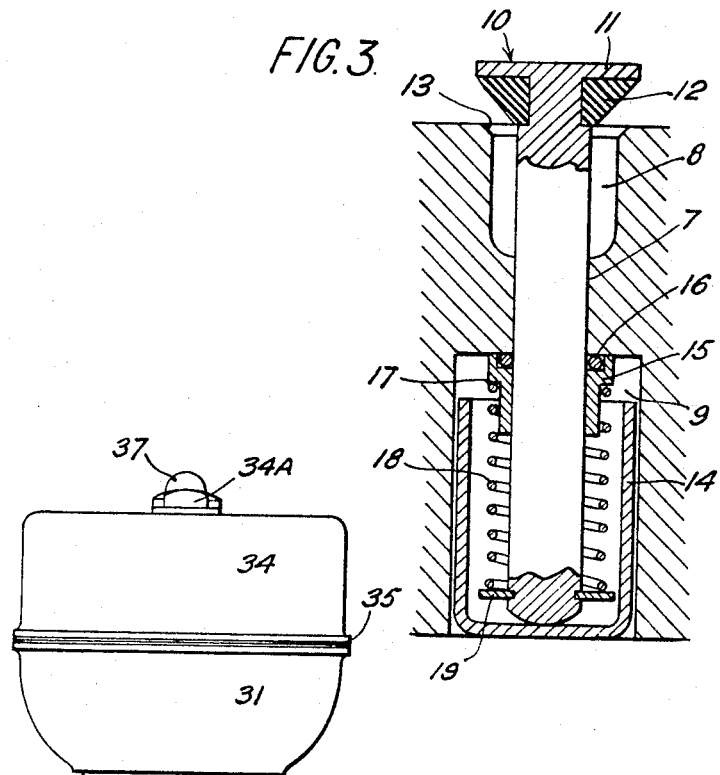
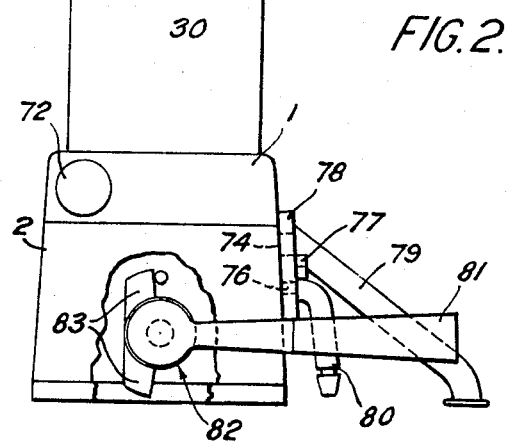
INVENTOR
BERNARD ALFRED COOK
BY
Hood, Gust and Irish,
ATTORNEYS.

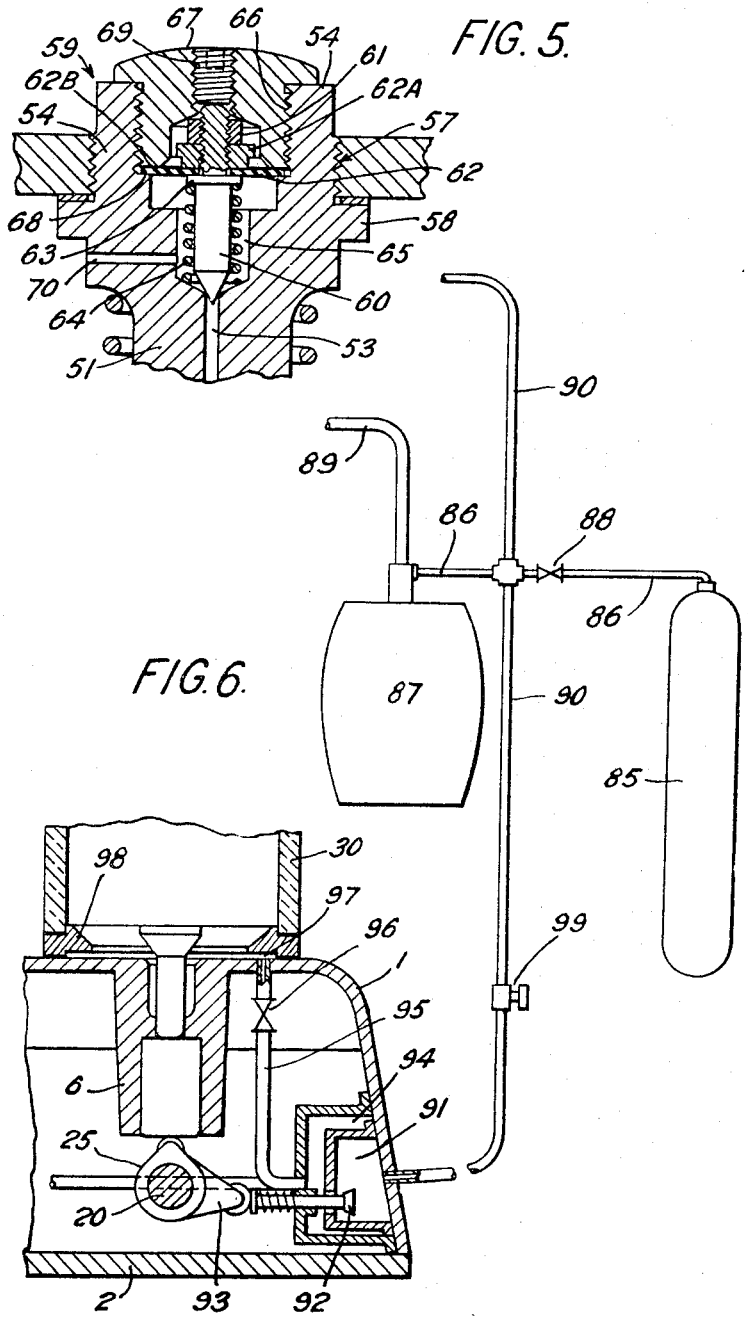

United States Patent Office 3,281,017
Patented Oct. 25, 1966

3,281,017
APPARATUS FOR DISPENSING MEASURED QUANTITIES OF LIQUIDS
Bernard Alfred Cook, Hounslow, England, assignor to Universal Equipment Co. (London) Ltd., Hounslow, England
Filed Apr. 26, 1965, Ser. No. 450,726
Claims priority, application Great Britain, May 8, 1964, 19,244/64
10 Claims. (Cl. 222—145)

This invention relates to apparatus for dispensing measured quantities of liquids, more especially beer or other carbonated liquids.

It is a present day requirement that a customer should be assured that an exact quantity of beer is served and an object of this invention is to provide apparatus that will dispense a measured quantity of beer and will also give a visual indication to a customer that the precise quantity of beer ordered has been drawn.

According to this invention apparatus for dispensing a measured quantity of gaseous liquid comprises a liquid measuring vessel, a gas expansion chamber associated with the vessel, a liquid inlet valve and a liquid discharge valve for the vessel, a valve for controlling the admission of the liquid to the expansion chamber from the vessel and communicating means between the vessel and the expansion chamber, the arrangement being such when the liquid has filled the vessel and has reached a level in the chamber, determined by the balance of the liquid and gas pressures, the supply of liquid to the vessel and to the chamber is cut off and the discharge valve is opened whereupon the gas under pressure passes by way of the said communicating means to effect the discharge of a measured quantity of the liquid from the measuring vessel through the discharge valve.

In a preferred arrangement, the invention includes a pair of liquid measuring vessels each having an associated gas expansion chamber, the inlet and discharge valves for the liquid being operable by cams mounted on a shaft which cams are angularly displaced on the shaft so that the said valves of the vessels are operable alternately thereby allowing one vessel to discharge its measured quantity of liquid while the other vessel is being filled with the liquid.

Another feature of the invention is that the liquid measuring vessels may be formed from a transparent material so that the liquid in the vessels is visible.

In order that the invention may be clearly understood it will now be described more fully, by way of example, with reference to the accompanying drawings in which:

FIGURE 2 is an elevation in the direction of the arrow "A," a part being shown in section;

FIGURE 3 is an axial section of one of the beer valves drawn to an enlarged scale;

FIGURE 5 is an enlarged axial section of the upper end of one of the valve guides showing the needle valve and FIGURE 6 is a diagram of the auxiliary $CO_2$ supply arrangements.

In a preferred arrangement, the invention includes a pair of liquid measuring cylinders each having an associated gas expansion chamber, the inlet and outlet valves for the liquid being operable by cams mounted on a shaft which cams are angularly displaced on the shaft so that the said valves are operable alternately thereby allowing one cylinder to discharge its measured quantity of liquid while the other cylinder is being filled with the liquid. Preferably, the liquid measuring cylinders are formed from a transparent material so that the liquid in the cylinders is visible.

Figure 1:
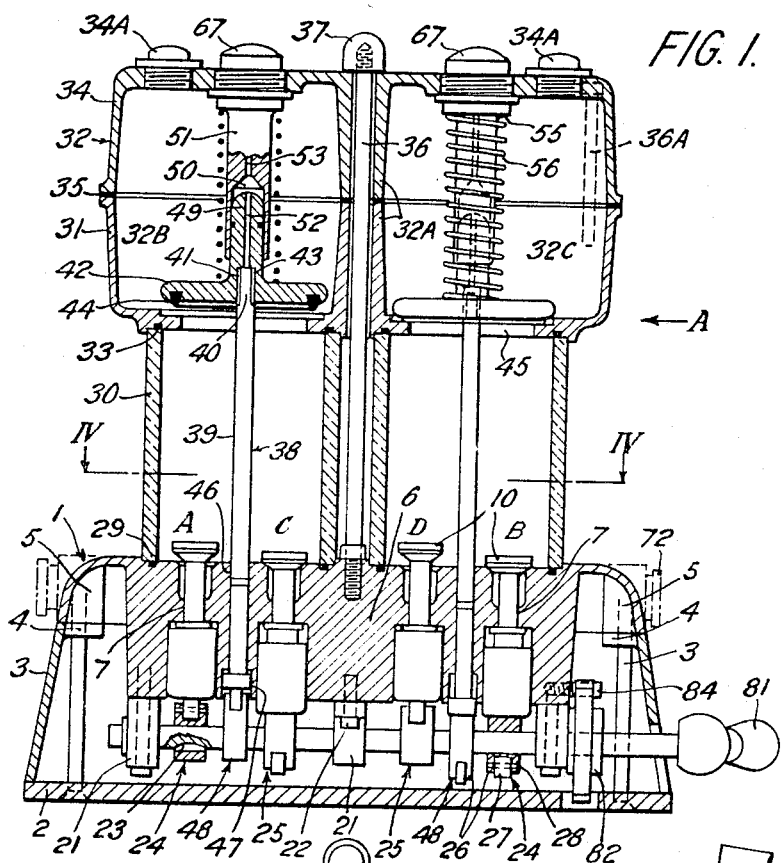
FIGURE 1 is a longitudinal central vertical section of apparatus according to the invention, parts of the apparatus being shown in elevation.
Figure 4:
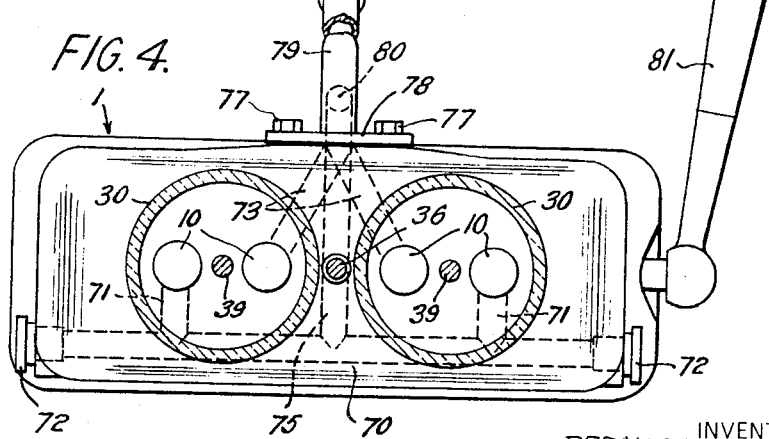
FIGURE 4 is a section on line IV—IV of FIGURE 1.

Referring to the drawings, a valve body 1 is fixed to a stand 2 by bolts 3 which pass through clearance holes in lugs 4 on the stand and which screw into projections 5 formed with the valve body 1, FIGURE 4. Any convenient means may be provided for fixing the stand to a counter or other support. The valve body is formed with a depending part 6 in which are two pairs of holes 7 of the same size each hole being counterbored as at 8 and 9. Slidable in each hole 7, as shown more clearly in FIGURE 3, is the stem of a beer valve 10 having a head 11 beneath which is a coned resilient washer 12 which seats on a bevelled edge 13 of the counterbore 8. Fitting in each counterbore 9 is a valve cup 14 and movable into each cup is a seal housing 15 having a sliding fit on the adjacent valve stem. Each housing 15 has a recess for a resilient "O" section sealing ring 16 which provides a liquid seal between the valve stem and the counterbore 9. Each housing is formed with a shoulder 17 which provides an abutment for one end of a valve spring 18, the other end of the spring having an abutment against a circlip 19 fitting in a groove in the valve stem. The springs 18 serve to load their respective valves in the closed position. In the arrangement described, valves A and B constitute beer inlet valves and valves C and D beer outlet valves.

Below the beer valves is a cam shaft 20 which is journaled at its ends and also at an intermediate position in bearing blocks 21 fixed to the depending part 6 of the valve body by screws 22. Fixed to the cam shaft as by keys 23 are inlet valve cam assemblies 24 and outlet valve cam assemblies 25. The angular relationship of the assemblies is such that the outlet valve cam assemblies operate their respective valves after a short delay following the closure of the inlet valves. Each assembly comprises a cam 26 which is slotted to receive a roller 27 rotatably mounted on a pin 28. The rollers engage the lower ends of the valve cups 14 so that when the cam shaft 20 is rotated the valve stems are contacted by the bottoms of their respective cups and are forced upwardly against the action of their respective springs 18. Thus, the inlet and outlet valves are opened alternately. It is preferred that the rollers of the outlet cam assemblies should be slightly greater in diameter than those of the inlet cam assemblies so that the extent of the opening of the outlet valves is greater than that of the inlet valves.

Seated on resilient sealing rings 29 fitting in annular recesses in the top of the valve body 1 are measuring cylinders 30 made from a transparent material, for example a suitable plastic. Rested on the upper ends of the cylinders 30 is a lower part 31 of a gas expansion chamber 32. In order to provide a fluid-tight seal between each cylinder and the lower part 31, the end of each cylinder abuts against a resilient sealing ring 33 fitting in an annular recess in the underside of the part 31. Fitting on the lower part 31 of the chamber 32 is an upper part 34, a gasket 35 of resilient material being disposed between the two parts of the chamber to form a fluid-tight joint. The parts 31 and 34 of the chamber are clamped together by a central rod 36 which is screw threaded at its upper end for a clamping nut 37 and which is also screw-threaded at its lower end for fixing to the valve body, additional clamping screws 36A being provided positioned one at each corner of the chamber. Each of the parts 31 and 34 has a central partition 32A which divides the gas expansion chamber 32 into two compartments 32B and 32C of equal size. In order to clean the compartments each may have a removable plug 34A for the admission of a cleaning fluid.

Axially of each measuring cylinder 30 is a valve push rod assembly 38 comprising a rod 39 which is reduced in diameter as at 40. The reduced diameter part projects into a hole 41 in a disc valve 42, the hole providing an annular space. The purpose of this space will later be made clear. Each valve 42 has an annular groove of dovetail shape in cross section in which is fitted an "O" ring 44 of resilient material. The valves 42 open and close apertures 45 in the compartments 32B and 32C, the "O" rings 44 providing a fluid-tight seal. Each rod 39 is slidable in a hole 46 in the valve body 1 which hole is counterbored as at 47 to receive a shoe fixed to the lower end of the rod 39. Mounted on the cam shaft 20 are cam assemblies 48 similar to the inlet and outlet valve cam assemblies 24 and 25 respectively, the rollers of the assemblies 48 engaging the shoes at the ends of a push rods 39. The angular position of the assemblies 48 relative to those of the inlet valve assemblies is such that the disc valves 42 open slightly before the opening of the beer inlet valves. Each disc valve 42 has a stem 49 which is slidable in an axial hole 50 in a cylindrical valve guide 51. Centrally of the stem 49 is a bore 52 communicating with the annular space 43 surrounding the upper end of the rod 39. The valve guide also has an axial bore 53, the purpose of which bores will later be made clear. Each valve guide has an enlargement 54 at its upper end, the enlargement providing a shoulder 55 which forms an abutment for a spring 56 for loading the disc valve on its seating. The enlargement of each valve guide is screw threaded as at 57 for the connection of the guide to the top of the gas-expansion chamber 32, a flange 58 on the enlargement providing a seating for a sealing washer.

In the uuper end of each valve guide 51 is a needle valve, shown more clearly in FIGURE 5, comprising a pin 60 coned at its lower end for seating on the upper end of the bore 53 in the valve guide. The pin has a screw-threaded shank for a nut 61 which clamps a rubber sealing diaphragm 62 onto a flange 63 on the pin, through the intermediary of a diaphragm retainer 62A. Normally lifting the pin from its sealing, is a spring 64 which abuts against the flange 63 and the bottom of the counterbore 65. Screw threaded in the top of each valve guide 51 is a cap 67 which clamps the diaphragm 62 onto a shoulder 68 towards the bottom of the hole 66, through the intermediary of a thin metal washer 62B. Centrally of each cap 67 is a grub screw 69 which engages the pin 60 and which may be turned to effect a fine adjustment of the needle valve against the action of the spring 64.

In the enlargement 54 of each valve guide is a lateral port 70 which communicates with the upper part of the adjacent compartment of the gas expansion chamber 32. Assuming that a needle valve is open and its associated disc valve 42 is closed, communication is effected between the top of its associated compartment in the chamber 32 and the upper end of the measuring cylinder immediately beneath the compartment, via the bore 53 in the valve guide 49, bore 52 in the valve stem 49 and the annular space 43 surrounding the upper end of the push rod. It will be understood that when the disc valve is closed, the reduced diameter part 40 of the push rod will project slightly below the under face of the disc valve.

Formed with the valve body 1 is a beer inlet manifold 70, FIGURE 4, having passages 71 which lead to the counterbores 8 associated with the beer inlet valves A and B. At the ends of the manifold are caps 72 which may be removed for cleaning the manifold. Also in the valve body are passages 73 which communicate with the counterbores 8 associated with the beer outlet valves C and D. The passages 73 merge into each other to form a beer outlet port 74 at one side of the body. Leading into the manifold 70 is a passage 75 which has an outlet 76 at the side of the body below the port 74. Fixed to the side of the body by screw threaded studs 77 is a fitting 78 having a beer delivery spout 79 and a nozzle 80 for connection to a source of beer supply, the spout communicating with the port 74 and the nozzle with the outlet 76. The spout 79 may be positioned above a drip tray, not shown.

One end of the cam shaft 20 extends through the body 1 and secured to the end is a valve operating handle 81. Fixed to the cam shaft is a stop member 82, FIGURE 2. The member is formed with opposite projections 83 which in turn contact a stop pin 84 screwed into the body, the arrangement limiting the angular displacement of the handle 81 to approximately 180°.

In order to use the apparatus, the handle 81 is moved to its extreme position in one direction. This has the effect of turning the cam shaft so that the beer inlet valve of one measuring cylinder 30 and the beer outlet valve of the other measuring cylinder are opened. Simultaneously with the opening of the beer inlet valve of a cylinder, its associated push rod 39 is operated to open the disc valve at the top of the cylinder. Thus, the movement of the push rod is double acting allowing beer to enter the measuring cylinder and to fill its associated compartment in the gas expansion chamber 32 to a level at which the liquid and gas pressures are in equilibrium.

Movement of the handle 81 in the opposite direction has the effect of closing the disc valve since the cam assembly 48 operating the push rod is angularly displaced to permit the push rod being forced downwardly by the valve spring 56 to close the valve. Simultaneously with the closing of the disc valve, the beer inlet valve is closed and, after a slight delay, the outlet valve is opened, the delay being effected by slight angular displacement of the cam operating the outlet valve relative to the cams actuating the inlet and disc valves. The gas compressed in the associated compartment of the gas expansion chamber under the control of the needle valve 59 passes via the port 70, bores 53 and 52, annular space 43 and into the measuring cylinder 30 to apply a top pressure to the beer in the cylinder whereupon, after a slight delay, a full measure of beer from the measuring cylinder is dispensed through the spout 79. Finally, excess gas is allowed to escape to the atmosphere via the outlet valve thus neutralizing the whole system after each cycle of operations.

The operations of filling one of the measuring cylinders and dispensing the beer therein have been described, and it is to be understood that the arrangement of the cams is such that, during the dispensing of beer from one measuring cylinder, the other cylinder is being filled ready for dispensing by the appropriate movement of the handle 81.

Beers differ in degrees of carbonation and in order to provide for these differences, each compartment of the expansion chamber may have a supplementary gas chamber, not shown, connected to it which may be brought into use when required by the operation of a valve, not shown.

If desired, the usual service supply of $CO_2$ may be connected to the compartments to effect or assist the dispensing of the beer.

Referring to FIGURE 6, an auxiliary supply of $CO_2$ may be supplied to the apparatus to effect the rapid dispensation of the beer. Such means may comprise a cylinder 85 containing $CO_2$ under pressure which cylinder is connected by a pipe 86 to a beer keg 87 via a reducing valve 88. Also connected to the keg is a beer delivery pipe 89 which supplies beer to the apparatus by a connection to the nozzle 80. The pipe 86 has branch 90 which may be connected to the compartments 32B and 32C of the apparatus via valve means, not shown, to augment the $CO_2$ in the compartments. Alternatively, or additionally, the branch may be connected to a chamber 91 in the stand 2 of the body 1, the chamber having valves 92 operable by cams 93 on the cam shaft 20. The angular position of the cam 93, relative to those of the beer outlet valves C and D, is such that the opening of the valves 92 is slightly delayed after the opening of their associated beer outlet valves. The chamber 91 is positioned within an outer chamber 94 to which $CO_2$ is admitted by the valves 92. The outer chamber has a central partition, not shown, dividing the outer chamber into two compartments. Each compartment is connected to the lower end of a measuring cylinder 30 by a tube 95 via a non-return valve 96. Preferably, the tubes open into an annular space 97 provided by a collar 98, which is adapted to provide a seating for the measuring cylinder, resilient sealing rings being provided to assure a fluid-tight fit for the cylinder. Connected in the pipe 90 supplying $CO_2$ to the chamber 91 is a push button valve 99 which may be located in any convenient position. Just before a full measure of beer is dispensed from a measuring cylinder the valve 99 can be pressed to admit $CO_2$ to the lower part of the cylinder to accelerate the discharge of the beer. It is to be understood that the $CO_2$ supplied to the compartments 32B and 32C augment the top pressure on the beer thereby speeding its discharge.

While there have been described above the principles of this invention in connection with specific apparatus, it is to be clearly understood that this description is made only by way of example and not as a limitation to the scope of the invention.

In the claims:

1. Apparatus for dispensing a measured quantity of gas-charged liquid comprising a liquid-measuring vessel, a gas expansion chamber having a fluid connection with said vessel, a liquid inlet valve and a liquid discharge valve connected to said vessel, valve means for controlling the flow of liquid from said chamber to said vessel, actuating means for opening said inlet valve and said valve means for admitting liquid to both said vessel and said chamber and also for closing said discharge valve, whereby gas is compressed in said chamber as said liquid rises to a level determined by the balance of liquid and gas pressures, said actuating means including means for closing said inlet valve and said valve means and opening said discharge valve whereby liquid in said vessel may be dispensed from the latter, and means for admitting said compressed gas from said chamber to said vessel when said inlet valve and said valve means are closed and said discharge valve is opened for assisting in the discharge of liquid from said vessel past said discharge valve, said valve means upon being closed preventing the flow of liquid from said chamber into said vessel.

2. Apparatus for dispensing measured quantities of gaseous liquid comprising a pair of liquid measuring cylinders, a gas expansion chamber associated with each cylinder, a liquid inlet valve and a liquid discharge valve for each cylinder, a valve for controlling the admission of the liquid to each expansion chamber, communicating means between each cylinder and its expansion chamber, means including a cam shaft mounting cams for operating the inlet and outlet valves of one cylinder and the inlet and outlet valves of the other cylinder alternately and further means including cams on the shaft for actuating the valves of the expansion chambers, each cylinder and its chamber having connecting means therebetween such that while the liquid is flowing into one cylinder to a level at which the liquid pressure is in equilibrium with the gas pressure in the expansion chamber, the liquid in the other cylinder is being discharged by the gas pressure in its associated gas expansion chamber acting on the liquid through the said communication means.

3. Apparatus according to claim 2, comprising a valve body for the liquid inlet and liquid discharge valves and also for the cam shaft and its cams, measuring cylinders mounted on the body, a gas expansion chamber having two compartments disposed one above each measuring cylinder and means whereby the chamber and cylinders may be secured to the body.

4. Apparatus according to claim 3, wherein the measuring cylinders are formed from a transparent material.

5. Apparatus according to claim 3 wherein the valves controlling the admission of the liquid to the gas expansion compartments are each actuated by a push rod operable by a cam on the cam shaft.

6. Apparatus according to claim 3, wherein each of the valves controlling the admission of the liquid to the gas expansion compartments has a stem which is slidable in a valve guide fixed to the gas expansion chamber, and wherein each of the said valves is loaded on a seating by a spring surrounding its valve guide.

7. Apparatus according to claim 6, wherein each valve guide and its associated valve stem each have an axial hole which holes communicate with the gas expansion compartment and with a measuring cylinder co-axial with the valve guide.

8. Apparatus according to claim 7, wherein the upper end of each of the aforesaid push rods is adapted to open and close the axial hole in its associated valve stem, whereby the flow of gas from each gas expansion compartment to its associated measuring cylinder is controlled.

9. Apparatus according to claim 8 wherein the valve guides each incorporates a needle valve operable externally of the gas expansion chamber whereby the flow of gas from the gas expansion compartments to their respective measuring cylinders may be manually controlled.

10. Apparatus according to claim 1 wherein means are provided for an auxiliary supply of gas under pressure to the apparatus whereby the discharge of the liquid is accelerated.

References Cited by the Examiner

UNITED STATES PATENTS

| 1,105,173 | 7/1914 | Baker | 222—447 X |
| 1,272,894 | 7/1918 | Bean | 222—70 X |
| 2,380,884 | 7/1945 | Von Stoeser et al. | 222—70 X |

ROBERT B. REEVES, *Primary Examiner.*

N. L. STACK, *Assistant Examiner.*